(12) United States Patent
Powell

(10) Patent No.: US 11,995,138 B2
(45) Date of Patent: May 28, 2024

(54) VIRTUAL NETWORK ANALYSIS AND EXPLOITATION

(71) Applicant: Jeffrey Powell, Bronx, NY (US)

(72) Inventor: Jeffrey Powell, Bronx, NY (US)

( * ) Notice: Subject to any disclaimer, the term of this patent is extended or adjusted under 35 U.S.C. 154(b) by 0 days.

(21) Appl. No.: 18/459,912

(22) Filed: Sep. 1, 2023

(65) Prior Publication Data

US 2023/0409651 A1 Dec. 21, 2023

Related U.S. Application Data

(63) Continuation of application No. 17/660,302, filed on Apr. 22, 2022, now Pat. No. 11,768,896.

(51) Int. Cl.
*G06F 16/9535* (2019.01)
*G06F 16/9536* (2019.01)
*G06Q 50/00* (2012.01)

(52) U.S. Cl.
CPC ...... *G06F 16/9535* (2019.01); *G06F 16/9536* (2019.01); *G06Q 50/01* (2013.01)

(58) Field of Classification Search
CPC .................. G06F 16/9535; G06F 16/9536
See application file for complete search history.

*Primary Examiner* — Grace Park
(74) *Attorney, Agent, or Firm* — INNOVATION CAPITAL LAW GROUP, LLP; Vic Lin

(57) ABSTRACT

Methods and systems that evaluate currently operating online personas is automated to establish the relationships between nodes and assign attributes. A virtual network exploitation (ViNE) protocol can create a prioritized list of every account in the extended network based on its influence score, as well as filtering, to create a subset of the influencer list of accounts that meet attribute criteria. Analysis of this data can identify the key accounts for the influencer and lead lists and provide recommendations on the path and strategy the client should use to most effectively engage the accounts of interest. Automated seed list generation for SNA can be operationalized to identify all of the existing leads within an extended social network in priority order and provide an influence score for each account. The system can be scaled to combine individual accounts that focus on a specific organization, personality or region.

19 Claims, 7 Drawing Sheets

VIRTUAL NETWORK ANALYSIS AND EXPLOITATION

BACKGROUND OF THE INVENTION

1. Field of the Invention

Embodiments of the invention relate generally to systems and methods for virtual network analysis and exploitation. More particularly, embodiments of the invention relate to an automated system and method to create seed data for Social Network Analysis (SNA) of virtual networks and apply the SNA results to identify leads and influencers within the extended network in priority order.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

SNA involves a process of investigating social structures through the use of networks and graph theory. Networked structures include nodes (individual actors within the network) and edges (relationships or interactions) connecting nodes. Examples of social structures commonly visualized through social network analysis include social media networks, memes spread, information circulation, friendship and acquaintance networks, business networks, knowledge networks and the like. These visualizations provide a means of qualitatively assessing networks by varying the visual representation of their nodes and edges to reflect attributes of interest.

Virtual personas, however, were unable to identify accounts that met their target audience criteria or key influencers within their personal network on various social media platforms.

In view of the foregoing, there is a need for automated systems and methods for creating seed data for SNA of virtual networks and apply the SNA results to identify leads and influencers within the extended network in priority order.

SUMMARY OF THE INVENTION

Embodiments of the present invention provide a method of automatically identifying lead and influencer accounts in an extended network of an online persona comprising determining friends of the online persona and friends of the friends of the online persona; creating an edges list, from the raw data (aka "combined_csv") file, as an edges file (also referred to as a raw data file) including a plurality of separate entries as separate rows in a spreadsheet, each of the separate entries including a first identification information concerning a specific friend of the online persona and a second identification information concerning a specific friend of the specific friend of the online persona; creating a nodes list as a node file, the node file being a duplicate of the raw data file, with duplicate ones of the plurality of separate entries removed, with the remaining columns C and D entries appended to columns A and B, and having a status identifier column in the spreadsheet added for each of the plurality of separate entries; establishing an op-update dictionary containing one or more personas of interest; comparing each of the plurality of separate entries in the node file with data in the op-update dictionary to find matching personas of interest from the op-update dictionary; creating a persona dictionary containing one or more controlled personas; comparing each of the plurality of separate entries in the node file with data in the persona dictionary to find matching controlled personas from the persona dictionary; adding the matching personas of interest and matching controlled personas into the status identifier for the one of the plurality of separate entries in the node file; and applying social network analysis metrics to the node file and the edges file to identify the lead and influencer accounts in the extended network.

Embodiments of the present invention further provide a method for automatically identifying accounts of interest in a virtual network, and software modules programmed for achieving the same, comprising determining friends of a subject; determining friends of the friends of the subject; creating an edges list as an edges file including a plurality of separate entries, each of the separate entries including a first identification information concerning a specific friend of the subject and a second identification information concerning a specific friend of the specific friend of the subject; creating a nodes list as a node file, the node file being a duplicate of the raw data file, with duplicate ones of the plurality of separate entries removed, with the remaining columns C and D entries appended to columns A and B, and having a status identifier added for each of the plurality of separate entries; establishing an op-update dictionary containing one or more personas of interest; comparing each of the plurality of separate entries in the node file with data in the op-update dictionary to find matching personas of interest from the op-update dictionary; adding the matching personas of interest into the status identifier for the one of the plurality of separate entries in the node file; and applying social network analysis metrics, including a custom metric that is specific to the present invention, to the node file and the edges file to identify the accounts of interest.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
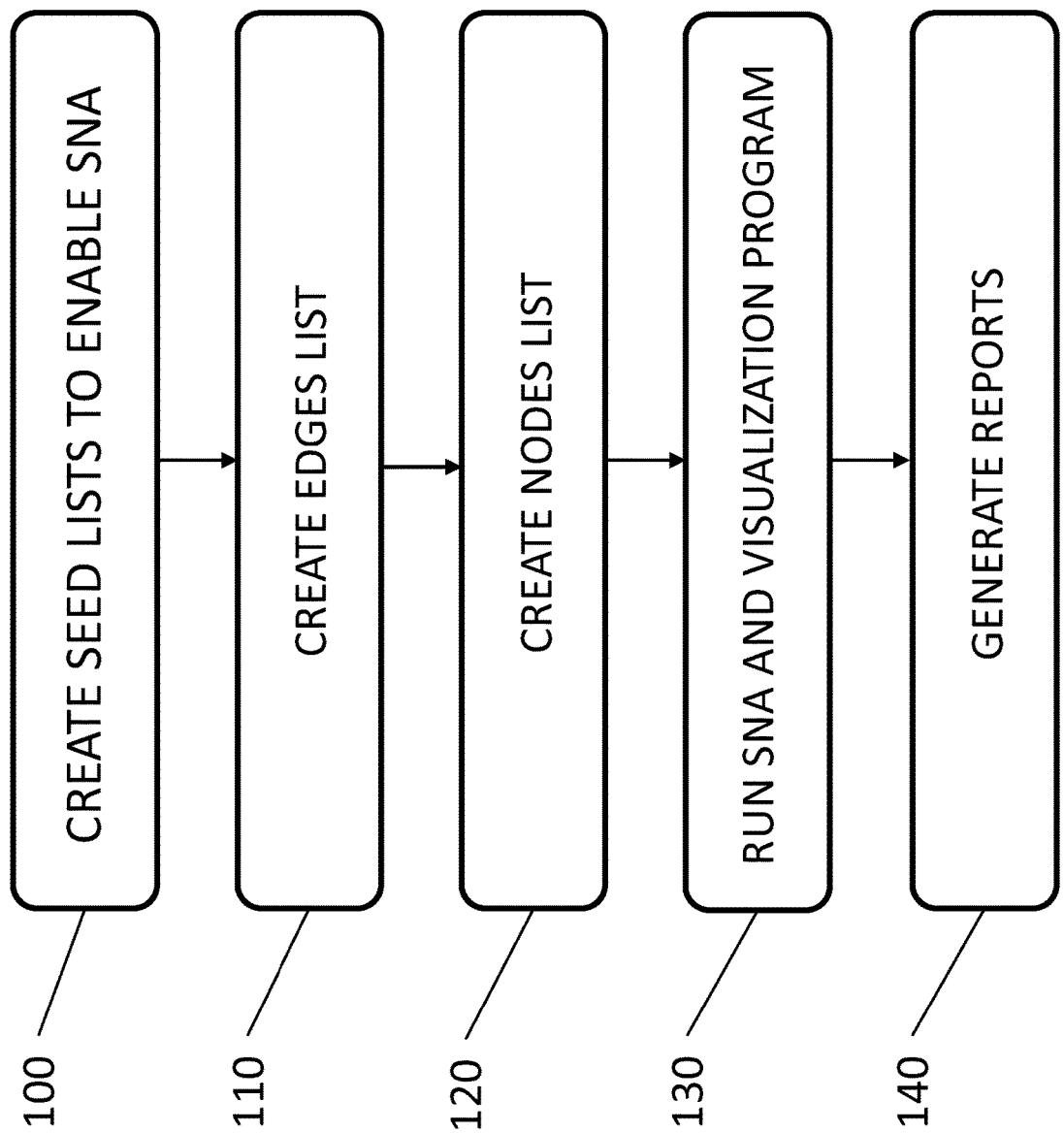
FIG. 1 illustrates a high-level block diagram describing a method according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object-oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java®, Jini®, C, C++, Smalltalk, Python, Perl, UNIX Shell, Visual Basic or Visual Basic Script, Virtual Reality Markup Language (VRML), ColdFusion® or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Broadly, embodiments of the present invention provide methods and system for the evaluation of currently operating online personas that is automated to establish the relationships between nodes and assign attributes. A virtual network exploitation (ViNE) protocol can create a prioritized list of every account in the extended network (a two-step SNA) based on its "influence" score as well as filtering to create a subset of the influencer list of accounts that meet the attribute criteria. Analysis of this data can identify the key accounts for the influencer and lead lists and provide recommendations on the path and strategy the client should use to most effectively engage the accounts of interest.

Aspects of the present invention provide methods to automate seed list generation for SNA that can be operationalized to identify all of the existing leads within an extended social network, such as friends of the persona and the friends' friends, for example, in priority order and provide an influence score for each account, which can be provided in priority order. The client can provide strategic and tactical direction for its online personas. The system can also be scaled to combine individual accounts that focus on a specific organization, personality or region to expand the options for engaging leads or deconflicting/coordinating efforts against selective leads/accounts.

As used herein, the term "friends" of a subject persona refers to online personas that are connected to the subject persona. "Friends" may be defined differently on different platforms, including terms such as buddies, connections, links, followers, contacts, or the like. Typically, "friends" are links that the subject persona makes or approves on the selected network. The subject persona can have a first plurality of friends. These are personas that are directly linked to the subject persona. The term "friends of friends" refers to a second plurality of friends that are "friends" of this first plurality of friends. The subject persona "A" can have friends "B" and C", while "B" can have friends "D" and "E" and "C" can have friends "F" and "G". Thus, the "friends of friends" of the subject persona "A" are "D", "E", "F" and "G".

As used herein, the term "persona" can refer to an online account on a specific online platform. Such an online account of a "persona" can belong to an individual, a group, a community, an organization, a government or the like. A "persona" may be any account that may be registered on an online platform.

As discussed in greater detail below, aspects of the present invention 1) build out an extended social network of a specific account/website to expand the reach and resonance of the account; 2) identify all of the accounts that meet the customer's lead criteria in priority order; 3) identify key influencers within the extended network in priority order (and highlight accounts with low influence to be avoided); and 4) create strategies to exploit the accounts of interest.

Figure 2:
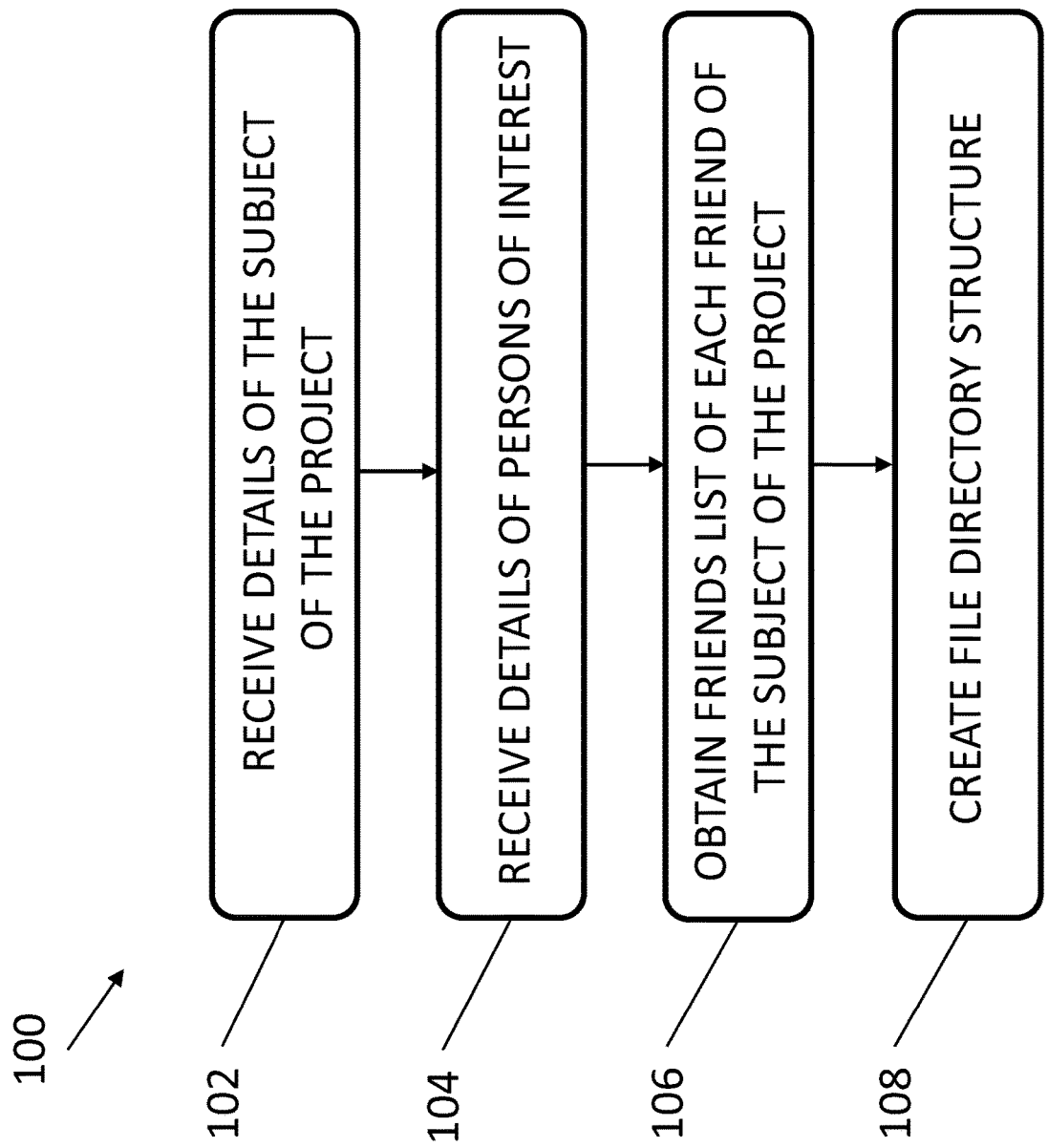
FIG. 2 illustrates a detailed block diagram describing steps associated with creating seed lists and enable SNA, according to an exemplary embodiment of the present invention.

Referring to FIGS. 1 and 2, according to aspects of the present invention, a first act 100 can create the seed lists to enable the SNA. This act can include a first sub-act 102 of receiving the details of the persona/account/website that will be the subject of the project. This is typically provided by the customer, which can be an individual, company, government, or the like. In some embodiments, a sub-act 104 can receive details of personas "of interest" from the customer. Next, in sub-act 106, the system can obtain the list of friends of the persona of interest and further obtain the list of the friend's friends of the persona of interest. This can be provided, for example, by a web crawler service. This information can be provided as a single file for each friend. Each list can contain as many as 5,000 entries, for example. In some embodiments, the files can be provided in a spreadsheet format (such as a .csv file) that contains four columns, where column A is the friend's social media ID, which is a unique number on the social media platform; column B is the username or display name; column C is the friend's friend's platform ID and column D is friend's friend's user or display name. The final edges list (that is, a list of the connections between the persona of interest, friends of the persona of interest, and the friend's friends of the persona of interest) may include a combined total of as many as 25 million row entries. In conventional processes for SNA, similar steps were completed manually and was prone to the introduction of errors that can cause downstream errors.

At the same time, in sub-set 108, a parent directory for the project is created using, for example, the persona's name and a child (subdirectory) can be created that will later house the friend lists from the web crawler.

Figure 3:
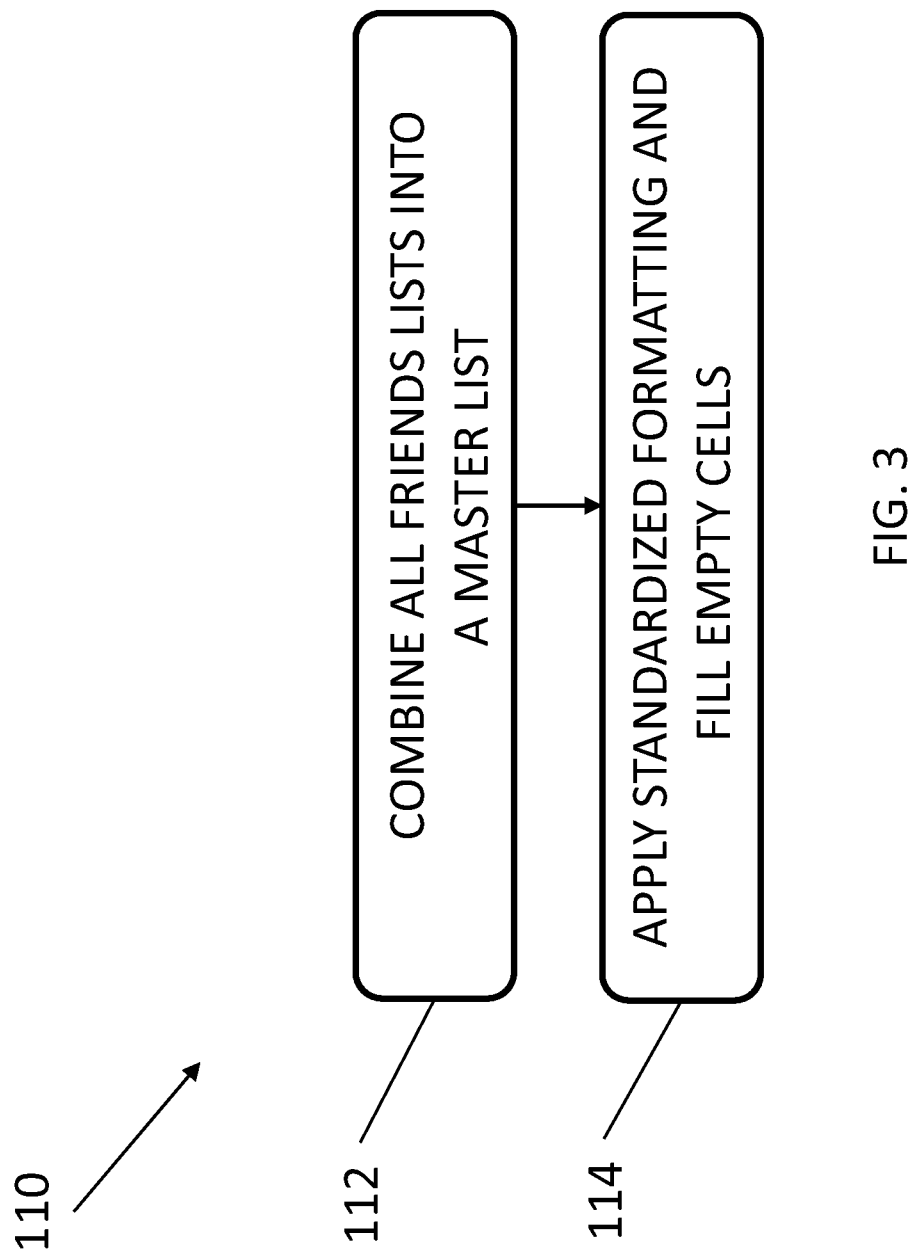
FIG. 3 illustrates a detailed block diagram describing steps associated with creating an edges list, according to an exemplary embodiment of the present invention.

Referring now to FIGS. 1 and 3, an act 110 can create an edge list. Software modules can be programmed, for example, in Python, generate the seed lists, where two lists are generated, an edges list and a nodes list, as discussed in greater detail below. In some embodiments, the edges list can be generated first and then the nodes list can be created from the output file from the edges script, since the nodes list builds off of a subset of the edges list.

At sub-act 112, an "EdgeListGenerator" program can be used to combine all of the friends lists into one correctly formatted master list, which can populate into the same directory as the individual friends lists and can be called, for example, "combined_csv". The script contains modules, at sub-act 114, that correctly formats each entry (per act 100) and automatically fills every empty cell in the spreadsheet in column A with "NoName" if an entry name is missing and a coded entry (such as NINCs (Hungarian for "none")) in columns B or C. The script can import and use the following Python packages: OS, glob, Pandas, Openpyxl and pprint by means of a Pandas data frame with parameters that account for most European languages; the parameter can be modified to accommodate any world language that has been previously used in programming.

Figure 4:
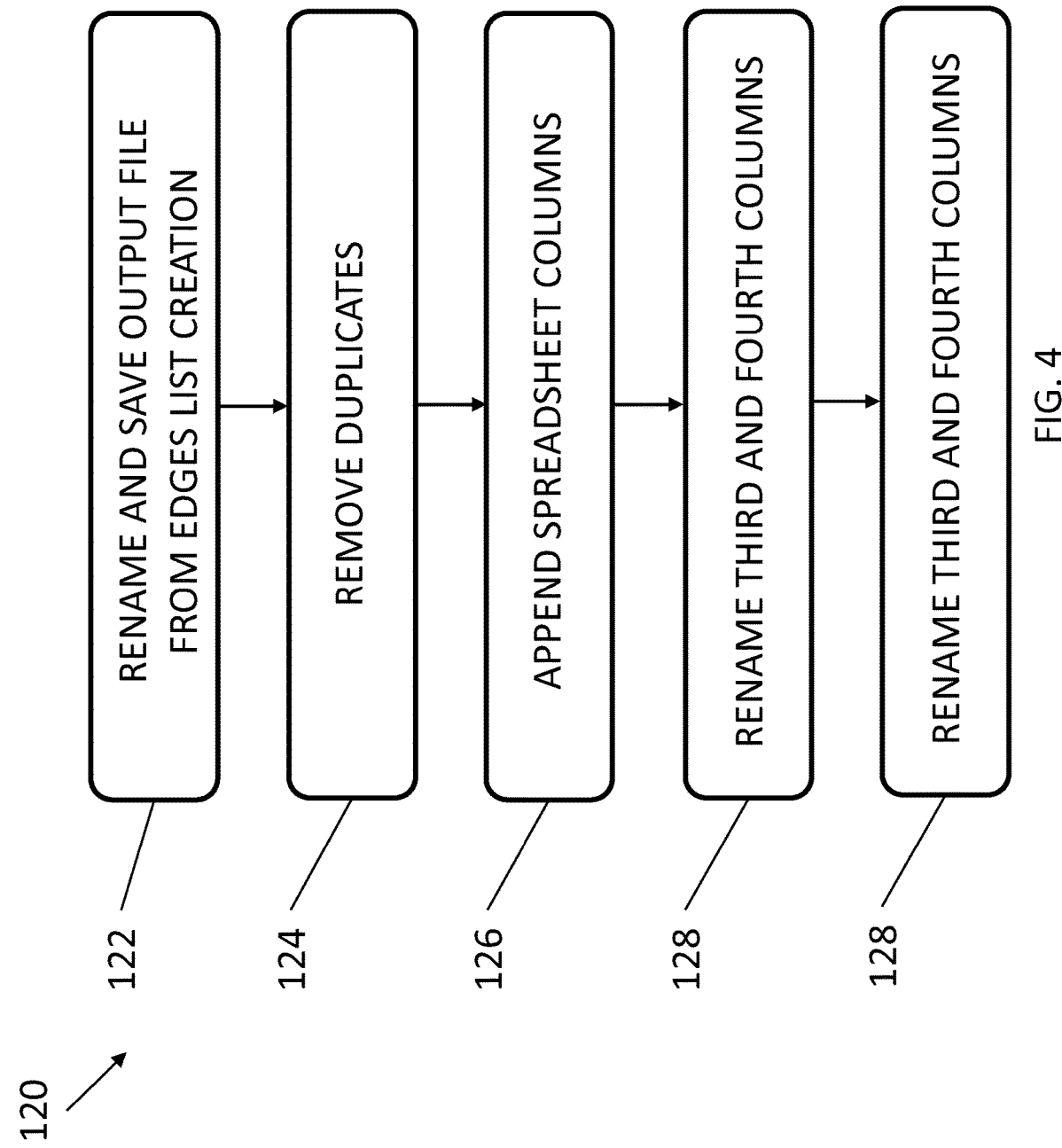
FIG. 4 illustrates a detailed block diagram describing steps associated with creating a nodes list, according to an exemplary embodiment of the present invention.

Referring now to FIGS. 1 and 4, an act 120 can create a nodes list. The nodes list is a compilation of each unique entry in the edges list output file. Using the combined_csv file for the project as the basis, the method can include 1) a first sub-act 122 that can rename and save the file as the nodeslist for the project using the convention, for example, "nodelist.persona name.final" in the parent directory for the project; 2) a second sub-act 124 that can use the built-in macro in the spreadsheet software to delete duplicates for columns A/B and C/D, then save the file; 3) a third sub-act 126 that can use the append function to move data (without the duplicates) from columns C/D to columns A/B; 4) a sub-act 128 that can add new headers for column C (called Status, for example) and column D (called Notes, for example); and 5) a sub-act 129 that can run a NodesListGenerator script.

This script can import the Python package, "openpyxl", can create a new spreadsheet workbook and can compare each entry against the customer-provided "of interest" or market intelligence data which can be converted into a Python dictionary named "ops_updates", for example, with the key being the user or display name of the account of interest and the value being "ops" or whatever term the customer prefers. A second dictionary can be created named, for example, "persona_updates" that can contain the unique ID of other accounts that the customer controls. The ops_updates dictionary can identify accounts that are leads for the persona, while the persona_updates dictionary can identify other accounts that the customer operates that could be used to deconflict the other personas' activity or provide an opportunity for these overlapping personas to cooperate against the accounts that they have in common.

The program can operate, for example, by using an embedded "for loops" and "if" statements that check each entry in both dictionaries against the contents of the nodes list. For each entry that appears in one of the dictionaries, a correct entry is added to the "status" column in the spreadsheet. The "notes" column is a free-form field that allows the customer to provide a status update regarding engagement of the account in question once the ViNE Protocol is complete and handed over. Follow-up iterative analyses can be run to update the results over time and provide follow-on guidance and recommendations. The output file will be named, for example, using the convention, "updatedpersonanameNodes".

Figure 5:
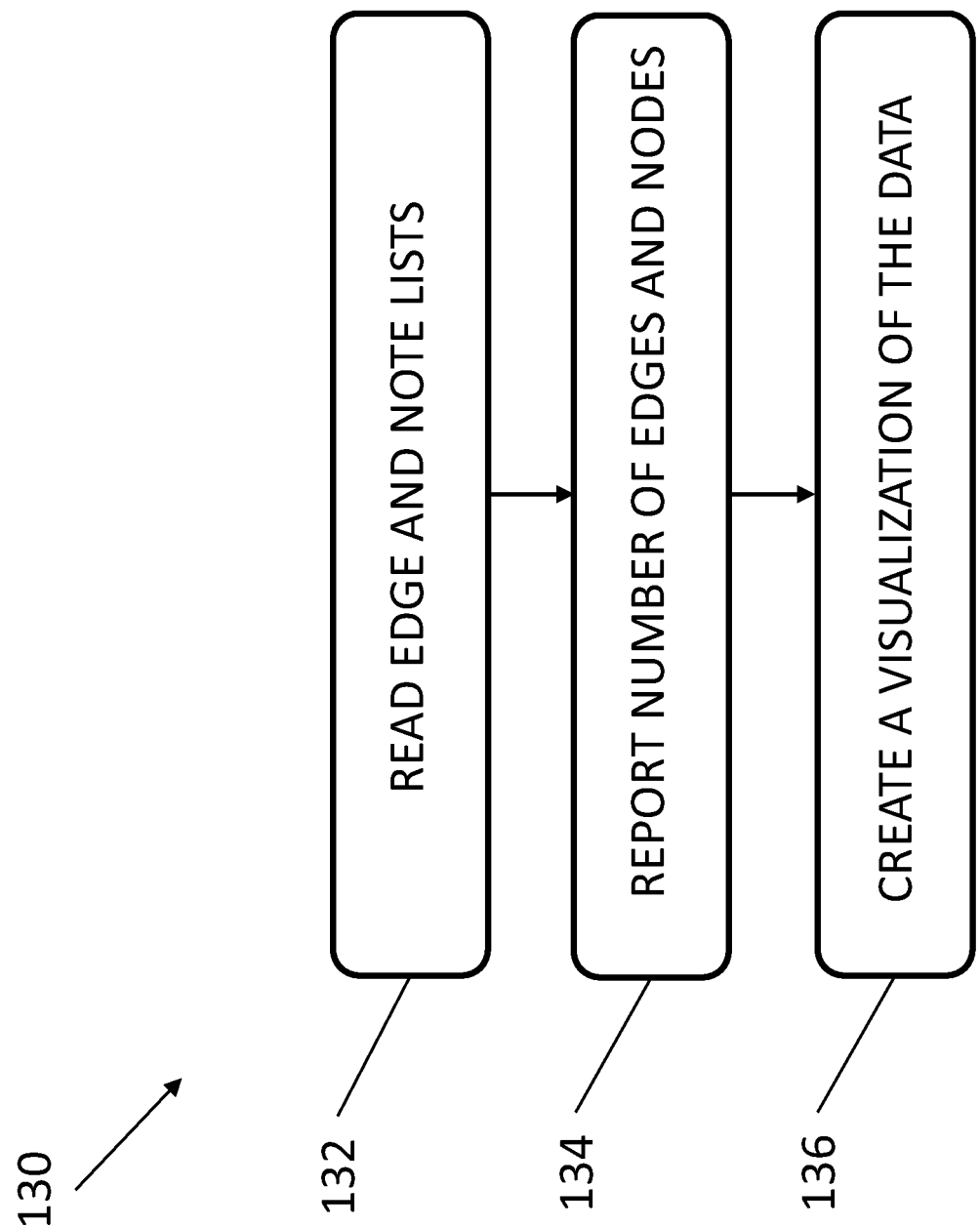
FIG. 5 illustrates a detailed block diagram describing steps associated with running SNA and visualization programs, according to an exemplary embodiment of the present invention.

Referring now to FIGS. 1 and 5, in an act 130, the SNA and visualization Python program can be run using the newly created edge and nodes lists and a ViNE_Ex_GephiMstr script. This program can import and use the following Python modules: csv, itemgetter, networkx, community (from networks.algorithms) and pprint. The program can, at sub-act 132, read the edge and node lists that were created in acts 110 and 120, respectively, can, at sub-act 134, report how many edges and nodes are contained in the network (called a graph in Python network nomenclature) and can, at sub-act 136, create a visualization of the data using the Gephi visualization software. Such a visualization is exemplified in FIG. 6. The network Python module contains utilities that segment the data from the SNA to generate centrality metrics that can focus on individual accounts of interest. The typical SNA metrics that are generated are (1) Betweenness (which account(s) connect the most groups/communities of other accounts), (2) Closeness (which is a measure of how near the subject account is to other accounts), (3) Eigenvector (which accounts are directly connected to the most accounts in the extended network), and (4) Degree (how many steps the account is from other accounts in its community). In addition to the standard SNA metrics, the system and methods of the present invention can calculate and use the combined Eigenvector and Betweenness (BE) score to assess influence and target priorities, because it does a better job of identifying the all-around most important accounts in the network. These modules can be used to provide detailed analysis of the connections between important nodes (individual accounts) as well as key influencers. The analysis is free form and depends on the needs of the client and the quality of the data.

Referring back to FIG. 1, in act 140, a report can be generated. The insights from the analysis can be gathered into a report that is provided to the client. In an exemplary embodiment, a first report is a "baseline" that can be used as the jumping off point to conduct follow-on ViNE Protocol analyses.

In some embodiments, an external network report, including SNA results and operational recommendations, can be generated based on the SNA data and the client's market intelligence. In some embodiments, an internal tradecraft report can be generated. An exemplary tradecraft report is discussed below with respect to FIG. 6.

Figure 6:
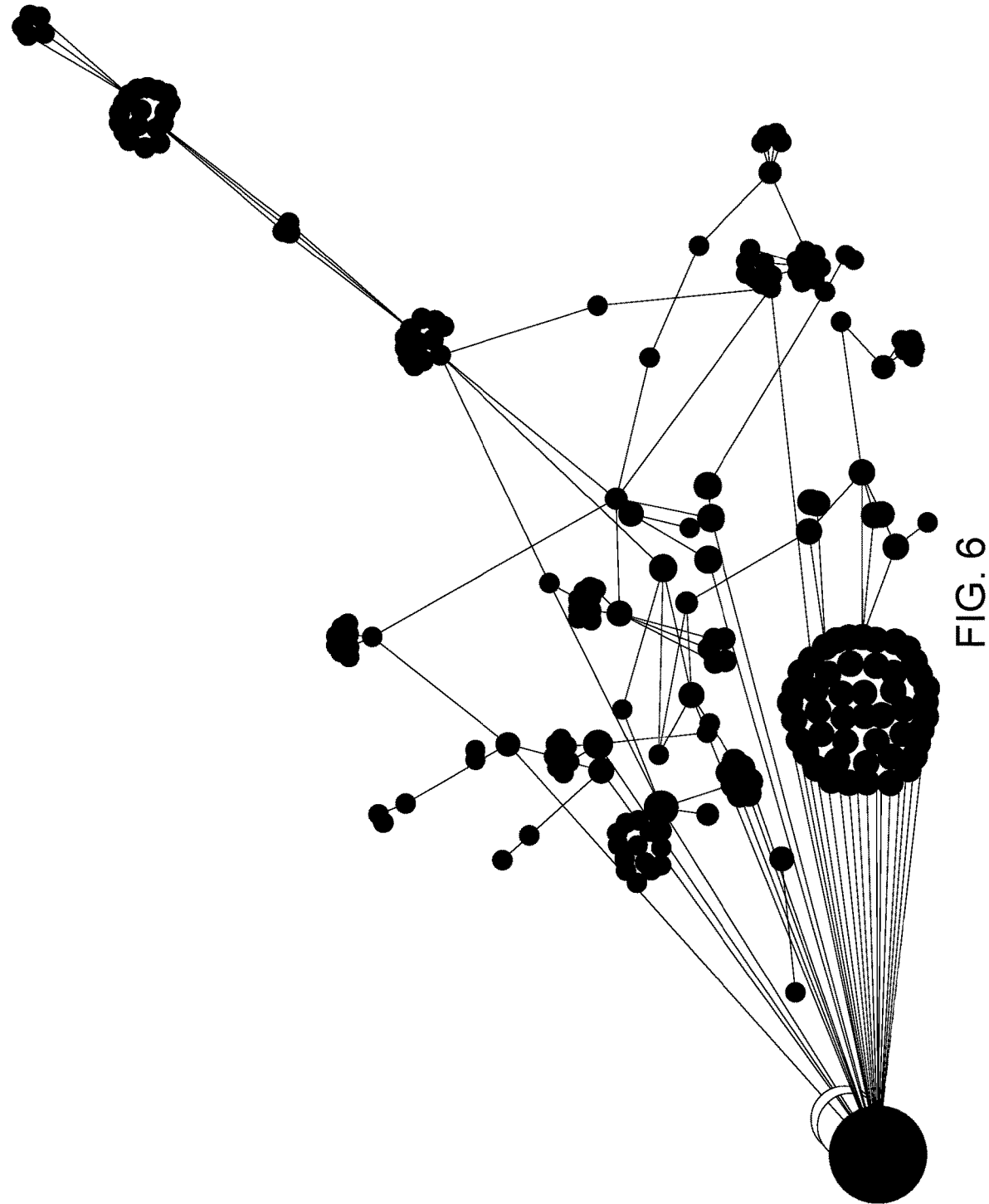
FIG. 6 illustrates an exemplary SNA graph generated by embodiments of the present invention.

Referring now to FIG. 6, in an exemplary project, the subject persona had only 10 connected accounts. Using aspects of the present invention, a total of 353 connections were identified, the influence score of every account in the extended network was identified, which accounts were of greatest importance, in terms of reach and resonance, were identified where none existed before, and every account that the client considered a lead was identified where none had been identified previously. The process, according to embodiments of the present invention, is much faster than conventional processes, creating the predicate seed lists in approximately 30 seconds versus 3 days when the sample list was created manually at the beginning of the development process for the present invention. Aspects of the present invention can identify the path that the subject persona should pursue for each of its most important leads.

In the Example of FIG. 6, from the persona of interest's (Jack Bauer) 10 friends with no known targets, the SNA identified 353 total nodes, providing expanded reach; and 30 targets identified that were previously unknown to be in the network. Operational paths from the persona of interest to each target is identified, where top influencers equate to greater resonance.

A sample external report for the example of FIG. 6 can describe, based on the Social Network Analysis (SNA), the persona, Jack Bauer, is the 10th most influential account in the extended network. There are 32 previously unidentified targets in the extended network. The SNA metrics identified these accounts as the top 5 targets (in priority order): Martha Smith, Vizsga Mir, Tiet Li, Baba Yaga and Sun Wu-kong.

The report may include op paths to Martha Smith, which can include Mitchell Forbes (0.099)→Martha Smith, Russell Arnow (0.113)→Martha Smith, Otto Autrey (0.312)→Martha Smith and Maya Pope (0.104)→Martha Smith. In this example, none of the paths contain a target. In this case, the system can recommend pursuing the path with the highest combined Eigenvector and Betweenness (BE) score (Otto Autrey), vice the SNA recommendation (Maya Pope).

The report may include targets associated with Martha Smith, ordered by priority, as well as the top five influencers of the network. These accounts can be used for reach and resonance of influence messaging or as part of an operational approach.

An exemplary tradecraft report can include an operational overview, which can state, for example, "During the most recent six-month reporting period (July-December 2021), the Jack Bauer persona (ID 351) engaged 10 identified high priority accounts. These efforts resulted in establishment of 2 information providing relationships, 1 handoff to cooperating persona and 3 operations that led to the arrest of terror cell members who were actively planning attacks against US interests. The average number of engagements per day was 7.2 with 1,080 total engagements of confirmed target audience accounts." The report can also include specific tradecraft of the persona, such as "Persona's engagements demonstrated high quality tradecraft including: Use of embedded hashtags on Twitter posts; Cross referencing of accounts that the target audience typically consumes; and Use of higher frequency accounts on more popular platforms to drive readership to emerging platforms and alternate client-operated accounts." The report can further include recommendations, such as "Data from across the area of responsibility (AOR) indicates that the target audience is moving to increased use of Telegram in lieu of Tutanota; recommend that persona create a Tutanota account in anticipation of a near term need to engage the target audience." Of course, the above is one example of various aspects of reports available with the system and methods of the present invention.

With the prior solution, the creation of the combined raw data seed list (the combined_csv file) was done manually and depending on the number of nodes in the network, could take 5-7 full work days versus 30 seconds with the methods and systems of the present invention. The cost savings of automated vs manual seed list creation saves $300/man hour per persona in contracting costs. Further, the cost to acquire raw data drops dramatically, where the previous solution relied on an outside firm with huge infrastructure and personnel (dozens of full-time onsite contractors) costs to provide the feed data for the seed lists. The solution provided by aspects of the present invention does this at a small fraction of the cost. Further, with the system and methods of the present invention, completeness is improved, since the previous solution discarded entries with missing information, where the present invention retains these entries (which may contain leads or key influencers). Finally, with the system and methods of the present invention, accuracy is improved. The previous solution relied on Humans to identify and weed out redundancies, errors and omissions, which can result in errors in the data. The system and methods of the present invention can avoid such issues with its automated approach.

For some personas of interest, as discussed above, the edges file can include millions or tens of millions of rows of data. Such compilation and analysis of data would be virtually impossible to achieve without the systems and methods of the present invention.

Figure 7:
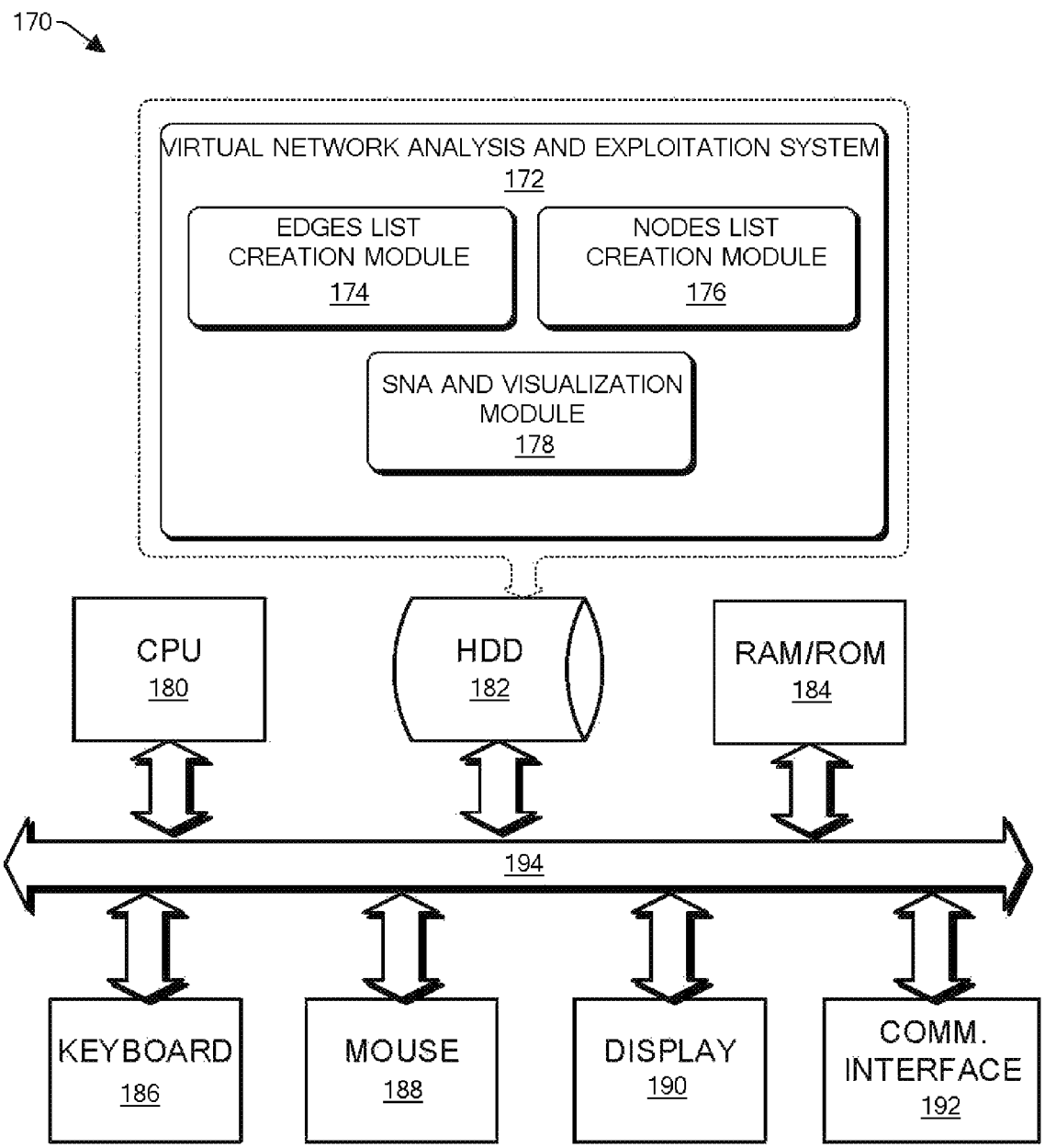
FIG. 7 illustrates a functional block diagram illustration of a computer hardware platform that can be used to implement a virtual network analysis and exploitation system, consistent with an illustrative embodiment of the present invention.

FIG. 7 provides a functional block diagram illustration of a computer hardware platform 170 that can be used to implement a particularly configured computing device that can host a virtual network analysis and exploitation system 172. The system 172 can include an edges list creation module 174, including program code to provide the functionality discussed above with respect to FIGS. 1 and 3; a nodes list creation module 176, including program code to provide the functionality discussed above with respect to FIGS. 1 and 4; and a SNA and visualization module 178, including program code to provide the functionality discussed above with respect to FIGS. 1 and 5.

The computer platform 170 may include a central processing unit (CPU) 180, a hard disk drive (HDD) 182, random access memory (RAM) and/or read only memory (ROM) 184, a keyboard 186, a mouse 188, a display 190, and a communication interface 192, which are connected to a system bus 194. Of course, other configurations for an exemplary computer platform 170 may be used to implement aspects of the present invention.

In one embodiment, the HDD 182, has capabilities that include storing a program that can execute various processes, such as the virtual network analysis and exploitation system 172, in a manner described herein.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for automatically identifying accounts of interest in a virtual network, comprising:
   determining friends of a subject;
   determining friends of the friends of the subject;
   creating an edges list as a raw data file including a plurality of separate entries, each of the separate entries including a first identification information concerning a specific friend of the subject and a second identification information concerning a specific friend of the specific friend of the subject;
   creating a separate file, a nodes list, as a node file, the node file initially being a duplicate of the raw data file, with duplicate ones of the plurality of separate entries removed and a status identifier field added for each resulting entry;
   establishing an op-update dictionary containing one or more personas of interest;
   comparing each of the plurality of separate entries in the node file with data in the op-update dictionary to find matching personas of interest from the op-update dictionary;
   adding the matching personas of interest into the status identifier field for the one of the plurality of separate entries in the node file; and
   applying social network analysis metrics to the node file and the raw data file to identify the accounts of interest.

2. The method of claim 1, further comprising:
   creating a persona dictionary containing one or more personas controlled by the subject;
   comparing each of the plurality of separate entries in the node file with data in the persona dictionary to find matching controlled personas from the persona dictionary;
   adding the matching controlled personas into the status identifier for the one of the plurality of separate entries in the node file.

3. The method of claim 1, wherein the one or more personas of interest in the op-update dictionary are provided by one of the subject or by market intelligence data.

4. The method of claim 1, wherein the raw data file and node file are spreadsheet files and each of the plurality of separate entries are rows in the spreadsheet files.

5. The method of claim 4, wherein:
the first identification information includes (1) an ID code assigned by a network of the specific friend of the subject and (2) a user-name of the specific friend of the subject; and
the second identification information includes (1) an ID code assigned by a network of the specific friend of the specific friend of the subject and (2) a user-name of the specific friend of the specific friend of the subject.

6. The method of claim 4, wherein every empty cell in the spreadsheet file is automatically filled in with a predetermined placeholder value.

7. The method of claim 4, wherein the node file appends the second identification information with the first identification information and the status identifier is a separate column in the spreadsheet file.

8. The method of claim 1, wherein the social network analysis metrics includes one or more of betweenness closeness, eigenvector and degree.

9. The method of claim 8, wherein the social network analysis metrics include a combined eigenvector and betweenness score to assess influence and target priorities.

10. The method of claim 1, wherein the accounts of interest are provided in a priority order.

11. The method of claim 1, further comprising providing output that includes strategies to exploit the accounts of interest.

12. The method of claim 1, wherein the step of determining friends of friends of the subject is achieved by one or more web crawlers.

13. A method of automatically identifying lead and influencer accounts in an extended network of an online persona, comprising:
determining friends of the online persona and friends of the friends of the online persona;
creating an edges list as a raw data file including a plurality of separate entries as separate rows in a spreadsheet, each of the separate entries including a first identification information concerning a specific friend of the online persona and a second identification information concerning a specific friend of the specific friend of the online persona;
creating separate file, a nodes list, as a node file, the node file initially being a duplicate of the raw data file, with duplicate ones of the plurality of separate entries removed and a status identifier field added for each resulting entry;
establishing an op-update dictionary containing one or more personas of interest;
comparing each of the plurality of separate entries in the node file with data in the op-update dictionary to find matching personas of interest from the op-update dictionary;
creating a persona dictionary containing one or more controlled personas;
comparing each of the plurality of separate entries in the node file with data in the persona dictionary to find matching controlled personas from the persona dictionary;
adding the matching personas of interest and matching controlled personas into the status identifier field for the one of the plurality of separate entries in the node file; and
applying social network analysis metrics to the node file and the raw data file to identify the lead and influencer accounts in the extended network.

14. The method of claim 13, wherein:
the first identification information includes (1) an ID code assigned by a network of the specific friend of the online persona and (2) a user-name of the specific friend of the online persona; and
the second identification information includes (1) an ID code assigned by a network of the specific friend of the specific friend of the online persona and (2) a user-name of the specific friend of the specific friend of the online persona.

15. The method of claim 13, wherein every empty cell in the spreadsheet is automatically filled in with a predetermined placeholder value.

16. The method of claim 13, wherein the social network analysis metrics includes one or more of betweenness closeness, eigenvector, degree and a combined eigenvector and betweenness score to assess influence and target priorities.

17. A non-transitory computer readable storage medium tangibly embodying a computer readable program code having computer readable instructions that, when executed, causes a computer device to carry out a method of automatically identifying accounts of interest in a virtual network, the method comprising:
determining friends of a subject;
determining friends of the friends of the subject;
creating an edges list as a raw data file including a plurality of separate entries, each of the separate entries including a first identification information concerning a specific friend of the subject and a second identification information concerning a specific friend of the specific friend of the subject;
creating separate file, a nodes list, as a node file, the node file initially being a duplicate of the raw data file, with duplicate ones of the plurality of separate entries removed and a status identifier field added for each resulting entry;
establishing an op-update dictionary containing one or more personas of interest;
comparing each of the plurality of separate entries in the node file with data in the op-update dictionary to find matching personas of interest from the op-update dictionary;
adding the matching personas of interest into the status identifier field for the one of the plurality of separate entries in the node file; and
applying social network analysis metrics to the node file and the raw data file to identify the accounts of interest.

18. The method of claim 17, further comprising:
creating a persona dictionary containing one or more personas controlled by the subject;
comparing each of the plurality of separate entries in the node file with data in the persona dictionary to find matching controlled personas from the persona dictionary;
adding the matching controlled personas into the status identifier for the one of the plurality of separate entries in the node file.

19. The method of claim 17, wherein:
the raw data file and node file are spreadsheet files and each of the plurality of separate entries are rows in the spreadsheet files; and
every empty cell in the spreadsheet file is automatically filled in with a predetermined placeholder value.

* * * * *